United States Patent
Helms

(10) Patent No.: US 6,748,545 B1
(45) Date of Patent: Jun. 8, 2004

(54) SYSTEM AND METHOD FOR SELECTING BETWEEN A VOLTAGE SPECIFIED BY A PROCESSOR AND AN ALTERNATE VOLTAGE TO BE SUPPLIED TO THE PROCESSOR

(75) Inventor: Frank P. Helms, Round Rock, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 582 days.

(21) Appl. No.: 09/621,931

(22) Filed: Jul. 24, 2000

(51) Int. Cl.$^7$ .................................................. G06F 1/26
(52) U.S. Cl. ........................................................ 713/300
(58) Field of Search ................................. 713/300, 320, 713/340

(56) References Cited

U.S. PATENT DOCUMENTS

| | | | |
|---|---|---|---|
| 5,086,501 A | | 2/1992 | DeLuca et al. |
| 5,142,684 A | * | 8/1992 | Perry et al. .................. 713/320 |
| 5,534,771 A | * | 7/1996 | Massie ........................ 323/285 |
| 5,659,789 A | | 8/1997 | Hausauer et al. |
| 5,715,467 A | * | 2/1998 | Jirgal .......................... 713/340 |
| 5,737,616 A | * | 4/1998 | Watanabe .................... 713/340 |
| 5,761,479 A | * | 6/1998 | Huang et al. ................ 710/301 |
| 5,821,924 A | | 10/1998 | Kikinis et al. |
| 5,835,780 A | * | 11/1998 | Osaki et al. ................. 713/300 |
| 6,031,742 A | * | 2/2000 | Journeau ...................... 363/60 |
| 6,282,662 B1 | * | 8/2001 | Zeller et al. ................. 713/300 |
| 6,448,672 B1 | * | 9/2002 | Voegeli et al. ................ 307/52 |
| 6,526,507 B1 | * | 2/2003 | Cromer et al. .............. 713/162 |

FOREIGN PATENT DOCUMENTS

JP         05108193 A  * 4/1993  ............ G06F/1/04

OTHER PUBLICATIONS

IBM, DC/DC Converter Output Voltage Control by Suspend Signal, Oct. 1, 1995, vol. 38, pp. 181–182.*

International Search Report Application No. PCT/US 01/14907, mailed Aug. 29, 2002.

* cited by examiner

Primary Examiner—Thomas Lee
Assistant Examiner—Mark Connolly
(74) Attorney, Agent, or Firm—Meyertons Hood Kivlin Kowert & Goetzel, P.C.; B. Noël Kivlin

(57) ABSTRACT

Disclosed herein are a method and apparatus to provide a deterministic power-on voltage in a system having a processor-controlled voltage level. In one embodiment, the system includes a DC/DC converter, a processor, and a selection circuit. The DC/DC converter receives a voltage setting signal or signals from the selection circuit and provides an adjustable power output signal having a voltage indicated by the voltage setting signal. The processor is powered by the adjustable power output signal. When powered, the processor provides a programmable voltage setting signal or signals. The selection circuit receives the programmable voltage setting signal or signals, a hardwired voltage setting signal, and a selection signal or signals, and when the selection signal is in a predetermined condition, the selection circuit provides the programmable voltage setting signal or signals from the processor to the DC/DC converter. Preferably, when the selection signal is in a second predetermined condition complementary to the first predetermined condition, the circuit provides the hardwired voltage setting signal to the DC/DC converter. The first and second predetermined conditions of the selection signal are preferably de-assertion and assertion, respectively. The selection signal may be determined by a logic gate that combines a mode control signal and a power good signal, and causes the selection signal to select the voltage setting signal from the processor only when the power good signal is asserted and the mode control signal is de-asserted. This advantageously allows for the processor to dictate its operating voltage level, an ability that is extremely useful for power and thermal management in notebook PCs.

17 Claims, 2 Drawing Sheets

SYSTEM AND METHOD FOR SELECTING BETWEEN A VOLTAGE SPECIFIED BY A PROCESSOR AND AN ALTERNATE VOLTAGE TO BE SUPPLIED TO THE PROCESSOR

BACKGROUND OF THE INVENTION

The present invention generally relates to a method for setting an initial power supply voltage in a system having a programmable power supply voltage.

It has recently been regarded as desirable to dynamically adjust the power supply voltage and clock frequency of computer system processors to minimize power consumption and regulate heating of the processor core. The computer system processors themselves would seem to be an ideal mechanism for controlling these adjustments but for the fact that they must first receive the power and clock before they can determine the appropriate settings.

Until the processor is supplied with a minimum power-up voltage, it is not capable of driving the voltage identification outputs to control its operating voltage. Therefore it is necessary for the system hardware to ensure the processor is supplied with the required power-up voltage and to prevent the DC/DC converter from responding to the processor's voltage identification outputs until the processor is driving them to select the startup voltage. To avoid damaging the processor, it is necessary to ensure that as the system is powered on, indeterminate signals from the processor do not cause the power supply voltage level to exceed the processors maximum operating limits.

SUMMARY OF THE INVENTION

The above issues are solved by a method and apparatus to provide a deterministic power-on voltage in a system having a processor-controlled voltage level. In one embodiment, the system includes a DC/DC power converter, a processor, and a selection circuit. The DC/DC converter receives a voltage setting signal from the selection circuit and provides an adjustable power output signal having a voltage indicated by the voltage setting signal. The processor is powered by the adjustable power output signal. When powered, the processor provides a programmable voltage setting signal. The selection circuit receives the programmable voltage setting signal, a hardwired voltage setting signal, and a selection signal, and when the selection signal is in a predetermined condition, the selection circuit provides the programmable voltage setting signal from the processor to the DC/DC converter. Preferably, when the selection signal is in a second predetermined condition complementary to the first predetermined condition, the circuit provides the hardwired voltage setting signal to the DC/DC converter. The first and second predetermined conditions of the selection signal are preferably de-assertion and assertion, respectively. The selection signal may be determined by a logic gate that combines a mode control signal and a power good signal, and causes the selection signal to select the voltage setting signal from the processor only when the power good signal is asserted and the mode control signal is de-asserted. This advantageously allows for the processor to dictate its operating voltage level, an ability that is extremely useful for power and thermal management in notebook PCs.

BRIEF DESCRIPTION OF THE DRAWINGS

A better understanding of the present invention can be obtained when the following detailed description of the preferred embodiment is considered in conjunction with the following drawings, in which.

Figure 1:
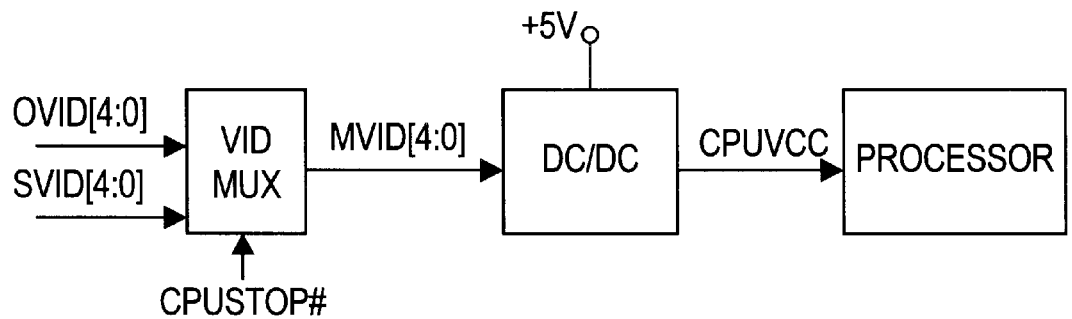
FIG. 1 is a functional block diagram of a system having hardwired voltage settings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Certain terms used throughout this disclosure are hereby defined. The term "signal" is intended to refer to a value conveyed via electrical impulses or electromagnetic waves on one or more conductive wires or other suitable transport media. Hence the word signal may be used to refer to a binary value conveyed by transmitting the representative bit values in parallel across multiple conductors. It may also be used to refer to an analog value conveyed by a proportional voltage on a single wire. It is to be understood that there are many ways to convey a value between components, and the use of the singular term "signal" in a claim does not limit the scope of the claim. The terms "asserted" and "de-asserted" are intended to refer to complementary conditions of a two-state signal. They are not necessarily respectively limited to digital logic "high" and "low" voltages. It is to be understood that the system designer can individually decide for each signal which digital logic states will represent the assertion and de-assertion of that signal. Such design considerations do not limit the scope of the invention.

DETAILED DESCRIPTION OF THE PREFERRED EMBODIMENT

Turning now to the figures, FIG. 1 shows a processor receiving a power supply voltage signal (CPUVCC) from a programmable voltage converter (DC/DC). The converter receives power (in this case +5V) and a voltage setting signal (MVID), and provides a regulated output voltage at the level indicated by the voltage setting signal. Because it is desirable to provide the system with a power-saving mode in addition to the normal operating mode, the voltage setting signal has two possible values: SVID for "sleep" mode and OVID for "operating" mode. A multiplexer (VID MUX) selects between these two voltage settings in response to a mode control signal (CPUSTOP#) which may be provided from the south bridge. In this embodiment, the OVID and SVID are hardwired, i.e. set by resistors, fuses, jumpers, or some other non-volatile mechanical means.

It is noted that computer systems typically have multiple buses with devices called "bridges" that allow communications between components on different buses. It is also noted that computer systems typically have support circuitry that perform administrative functions such as interrupt management (the interrupt controller), clock/calendar/timer functions (the clock), configuration management, power supply control, and power-on signal sequencing. This support circuitry has commonly been placed in the bridge from the PCI bus to the peripherals and lower bandwidth busses, i.e. the "south bridge".

Consequently, one of skill in the art will recognize that the south bridge may be configured to monitor the activity level of the computer system, and to place the computer system into a "sleep" mode if it is determined that the computer system has been inactive for a predetermined length of time. In the embodiment of FIG. 1, the assertion of the mode control signal causes the power supply voltage to be lowered to the hardwired sleep setting. In systems having APM (Advanced Power Mangaement), if the south bridge later detects activity, (e.g. a key press or motion of a pointing device), the south bridge can deassert the mode control signal to raise the power supply voltage to the hardwired "operating" setting. In systems having ACPI, the operating system decides when to place the system into a sleep state, and calls device drivers to place the devices into a low power state and then manipulates a register in the south bridge to initiate the hardware sequence into the sleep state.

One example of a programmable voltage converter is a MAXIM MAX1711 High-Speed, Digitally Adjusted Step-Down Controller or its equivalent. The MAX1711 can transition between selected voltages in less than 100 us. The MAX1711 uses its D4 through D0 inputs to determine the output voltage level as follows:

| D4:D0 | Output Voltage |
|---|---|
| 00000 | 2.00 |
| 00001 | 1.95 |
| 00010 | 1.90 |
| 00011 | 1.85 |
| 00100 | 1.80 |
| 00101 | 1.75 |
| 00110 | 1.70 |
| 00111 | 1.65 |
| 01000 | 1.60 |
| 01001 | 1.55 |
| 01010 | 1.50 |
| 01011 | 1.45 |
| 01100 | 1.40 |
| 01101 | 1.35 |
| 01110 | 1.30 |
| 01111 | Shutdown |
| 10000 | 1.275 |
| 10001 | 1.250 |
| 10010 | 1.225 |
| 10011 | 1.200 |
| 10100 | 1.175 |
| 10101 | 1.150 |
| 10110 | 1.125 |
| 10111 | 1.100 |
| 11000 | 1.075 |
| 11001 | 1.050 |
| 11010 | 1.025 |
| 11011 | 1.000 |
| 11100 | 0.975 |
| 11101 | 0.950 |
| 11110 | 0.925 |
| 11111 | Shutdown |

See the MAXIM Data sheet for more information on Shutdown.

It is desirable to provide processors such as upcoming versions of AMD's K6-III and Athlon processors with voltage identification (VID) output signals that they will drive to the DC/DC converter that supplies their operating voltage. These, in addition to adjustable core frequencies, will allow for maximum Notebook PC performance in any thermal environment, and will also allow the user to determine the tradeoff between performance and battery life.

The processors will preferably be provided with a register that contains the current voltage setting. When the processor is reset, the voltage setting is initialized to some "safe" voltage such as, e.g. 1.5 V, and during the assertion of the reset signal, the setting signals are driven to the processor output pins. When desired, the voltage setting signals are changed by writing to this register.

When the system would be first powered on, the processor would not be powered, and would therefore not be capable of driving its VID outputs until its voltage becomes stable at an operational level and its clock is running. Also, as power is applied to the processor, the state to which it would drive its VID outputs could not be guaranteed until the voltage is within its specified limits, reset is asserted, and the clock to the processor is running and stable. Additionally, some processors require a power good signal to be asserted to the processor before the processor drives its startup VID. However since outputs of the processor are used to dictate to the DC/DC converter what voltage level should be driven to the processor, it cannot be known what voltage will be driven to the processor when the system is first powered on. The possibility exists that the DC/DC converter could drive a voltage so low that the processor would not be able to operate enough to drive its VID outputs to select the intended power up voltage. If this scenario occurred the system would he "hung" in a state that it could not exit from. Another possibility is that the DC/DC could drive a voltage level that is higher than the maximum allowed voltage for the processor. Either of these scenarios could damage the CPU after some period of time.

Figure 2:
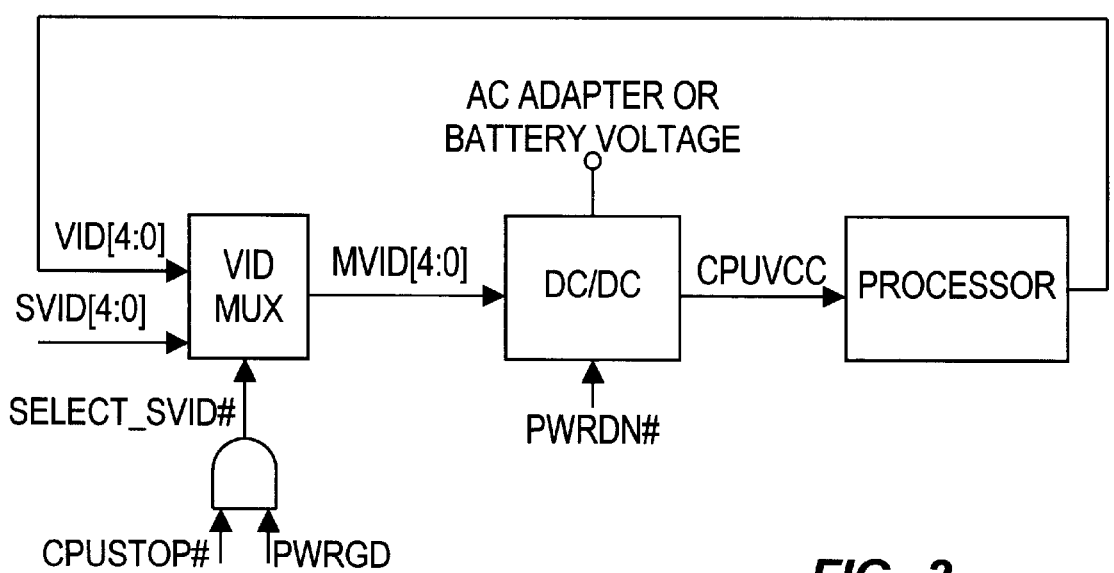
FIG. 2 is a functional block diagram of a system having processor-controlled voltage settings.

FIG. 2 shows a configuration that solves this problem by ensuring that the processor is always supplied with a voltage at which it will be operational when the system is powered on. In this embodiment, the sleep voltage setting signals SVID are still hardwired, but the operating voltage setting signals are provided by the processor. A selection signal (SELECT_SVID#) is provided to the multiplexer to select the appropriate multiplexer input. A logic circuit is used to produce this selection signal. When the selection signal is asserted, the multiplexer selects the hardwired voltage setting signals, whereas when the selection signal is de-asserted, the multiplexer selects the voltage setting signals from the processor.

The logic circuit is preferably designed to assert the selection signal during the initial power-up sequence and whenever the computer system goes into the sleep mode. Accordingly, the logic circuit operates on the mode control signal (CPUSTOP#) and the power-good signal (PWRGD). Only if the mode control signal is asserted to indicate sleep mode or if the power-good signal is de-asserted does the logic circuit assert the selection signal. Otherwise the selection signal is de-asserted.

Persons of skill in the art are familiar with the power-good signal. When power is initially applied to a computer system, this signal is held in a de-asserted state until all of the voltage rails in the system are stable within specified limits. At that time, the power-good signal is asserted and maintained until the system is powered down. The PWRGD signal of FIG. 2 is deasserted so that SVID[4:0] drives the DC/DC until CPUVCC is at a level where the processor can deterministically drive the VID signals. It will be the responsibility of the BIOS or system software to set the VID signals early in the POST routine to transition the processor core voltage to the desired performance level.

As a quick aside, it is noted that the DC/DC converter of FIG. 2 may receive a power down (PWRDN#) signal. PWRDN# is a control input that when asserted causes the DC/DC to shut off its outputs, and enter a low power state.

Figure 3:
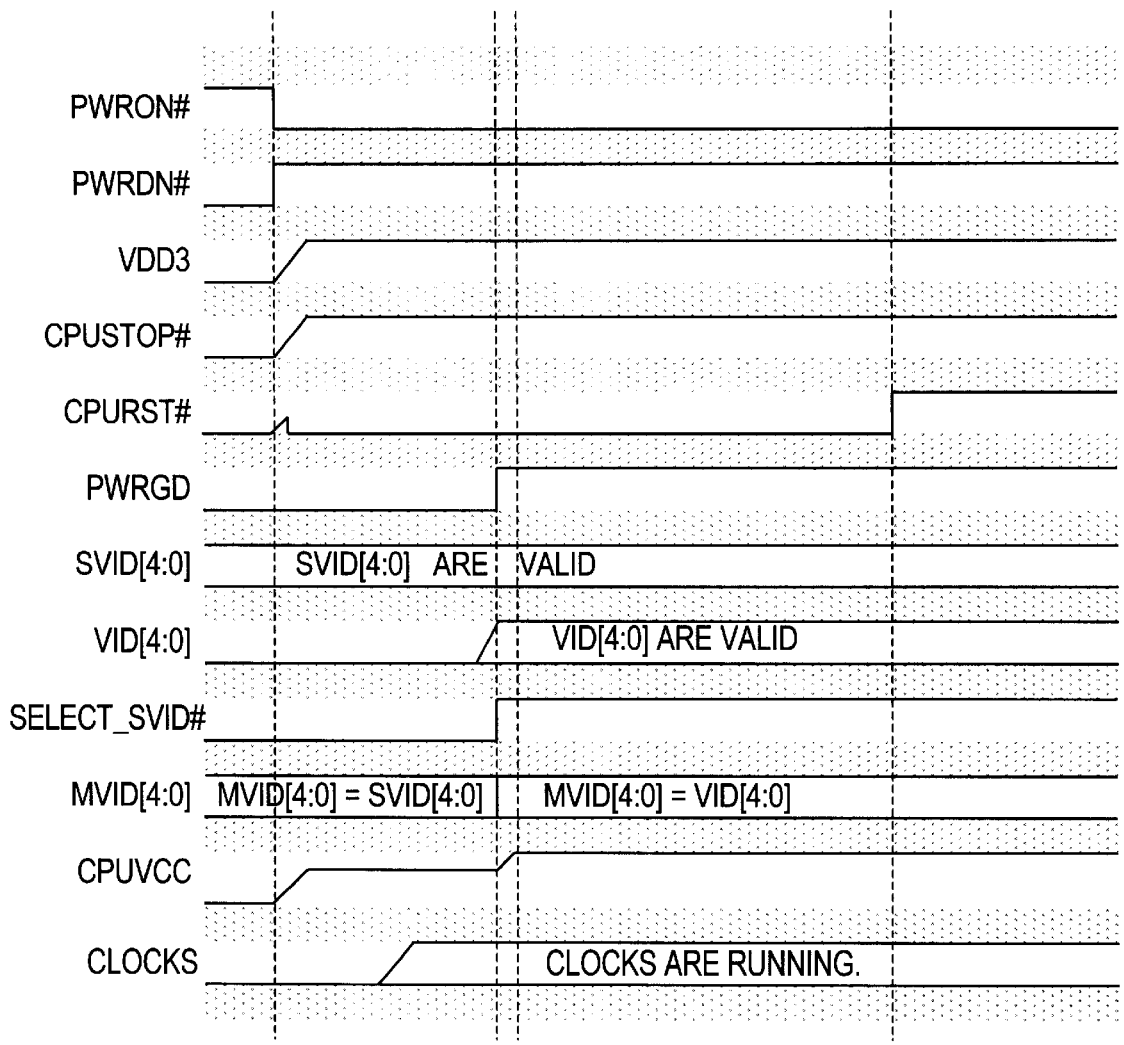
FIG. 3 is a timing diagram showing the operation of the deterministic power-on method.

FIG. 3 illustrates the operation of the deterministic power-on circuit by showing a sequence of signal transitions after an exemplary computer system is turned on. When the user presses the power switch, the power on (PWRON#) signal is asserted, and the power down (PWRDN#) signal is de-asserted. After the power rails for the system are within specified limits, the power good (PWRGD) signal is asserted.

As the sleep voltage setting (SVID) signals are hardwired, they are always fixed at their predetermined values. Conversely, the operating voltage setting (VID) signals are not driven to their programmed values until the processor has been powered. Preferably, these signals reach their programmed values before assertion of the system power good signal. However, the VID signals can be driven to select the operating voltage as the power good signal is asserted. The selection signal (SELECT_SVID#) is preferably de-asserted only after the power good signal is asserted, causing the multiplexed voltage setting (MVID) signal to equal the sleep voltage setting signals until the power good signal is asserted. The de-assertion of the selection signal then causes the multiplexed voltage setting signal to equal the operating voltage setting signals provided by the processor. Preferably, the allowed transition time from the power up voltage selected by SVID to the operating voltage selected by the CPU VID outputs is 100 microseconds.

Consequently, the processor voltage (CPUVCC) signal is deterministically controlled. Before the power good signal is asserted, the processor is powered at the sleep voltage setting. This is sufficient to let the processor drive the programmed operating voltage setting signals. After the power good signal is asserted, the processor is powered at its programmed operating voltage setting. The clock signals are operating before the power good signal is asserted, so that the processor can propagate the reset signal and drive the startup VID when the CPU_PWROK signal (may be the system power good signal) is asserted. At approximately 1.8 milliseconds after the power good signal is asserted, the processor reset signal is de-asserted, allowing the processor to be fetching code from the address for its reset vector.

Changes to the startup voltage and frequency setting can later be made by system software. In an exemplary system, the following steps will be taken to carry out a change to the voltage settings.

1) A software driver is called to transition the CPU voltage and frequency.
2) For K6 systems, the SMM handler sets the advanced configuration and power interface (ACPI-) defined arbitration disable (ARB_DIS) bit in the north bridge to prevent system bus masters from being granted the bus and access to system memory while the transition is taking place. This is required for K6 because the processor is not capable of responding to cache snoops while its core voltage and/or frequency are being transitioned.
3) The SMM handler verifies that all system bus activity has ceased before initiating the transition. This is required because there could be a bus master cycle in progress when the ARB_DIS bit is asserted, and this transaction will have to complete before the system bus master relinquishes control of the system bus. The SMM handler can determine that no system bus master has control of the system bus by reading a register in the south bridge. This read cannot complete until any system bus master that has control relinquishes ownership of the system bus.
4) The SMM handler writes to registers in the processor to specify the new voltage and frequency that the processor should operate at and then writes a register to initiate the transition to the new voltage and frequency.
5) The SMM handler clears the ARB_DIS bit in the north bridge to allow system bus masters access to system memory.
6) The SMM handler executes a resume (RSM) instruction to return the processor to normal operation.

It is noted that SMM is only required for K6. For K7, the ARB_DIS bit is not used for voltage and frequency transitions and neither is SMM mode.

Numerous variations and modifications will become apparent to those skilled in the art once the above disclosure is fully appreciated. As an example, it is noted that it is not necessary to drive all of the VID[4:0] outputs of processor to the voltage select inputs of the DC/DC converter. The voltage select inputs of the DC/DC that are not driven by the processor VID outputs can be strapped high or low on the motherboard with a resistor.

Further, it is not necessary to use a multiplexer, as other logic can achieve the same functionality. It is even possible that at some point, the DC/DC converter will incorporate the multiplexer functionality so that a separate logic circuit will be unnecessary.

Additionally, when using DC/DC converters that rely on a "feedback voltage" rather than a digital look-up table, the voltage setting inputs may be applied to change an impedance value of a voltage divider network to vary the feedback voltage and thereby set the desired output voltage. It is intended that the following claims be interpreted to embrace all such variations and modifications.

What is claimed is:

1. A computer system that comprises:
   a DC/DC converter configured to provide an adjustable output voltage;
   a processor powered by the adjustable output voltage of the DC/DC converter, wherein the processor provides one or more voltage identification signals; and
   a selection circuit configured to receive the voltage identification signals, an alternate voltage setting signal, and a selection signal, wherein the selection circuit is configured to provide the voltage identification signals or the alternate voltage setting signal to control the output voltage of the DC/DC converter dependent upon a state of the selection signal.

2. The computer system of claim 1, wherein the alternate voltage setting signal is provided by the selection circuit when the selection signal is asserted and wherein the voltage identification signals are provided by the selection circuit when the selection signal is de-asserted.

3. The computer system of claim 2, further comprising:
   a power supply configured to provide power to the DC/DC converter when the system is powered-on, wherein the power supply is further configured to provide a power good signal which is de-asserted for a predetermined time after the system is powered-on.

4. The computer system of claim 3, wherein the selection signal is de-asserted only if the power good signal is asserted.

5. The computer system of claim 4, wherein the selection signal is provided by a logic gate, and wherein the logic gate is configured to determine the selection signal by combining the power good signal with a mode control signal.

6. A method for assuring an adjustable, deterministic voltage is provided to a processor, wherein the method comprises:
   a circuit receiving at least one hardwired voltage setting signal;
   the circuit receiving at least one adjustable voltage setting signal from the processor;

the circuit receiving a selection signal that determines which of the hardwired voltage setting signal and the adjustable voltage setting signal is provided to a DC/DC converter;

the DC/DC converter providing a voltage to the processor, wherein the voltage level is set by the voltage setting signals received from the circuit, and wherein the voltage setting signal is set to the hardwired voltage setting signal when power is initially supplied to the DC/DC converter.

7. The method of claim 6, further comprising:

using a power good signal as the selection signal to prevent the circuit from providing the adjustable voltage setting signal while the power good signal is de-asserted.

8. The method of claim 7, further comprising:

using a mode control signal as the selection signal to prevent the circuit from selecting the adjustable voltage setting signal while the mode control signal is asserted.

9. The method of claim 8, wherein a logic gate sets the selection signal to select the adjustable voltage setting signal when the power good signal is asserted and the mode control signal is de-asserted.

10. A system that comprises:

a DC/DC converter that receives voltage selection inputs and provides an adjustable voltage output level having a voltage specified by the voltage selection inputs;

a electrical component configured to receive the adjustable voltage output from the DC/DC converter, wherein the component provides voltage selection output; and a selection circuit configured to receive the voltage selection outputs from the electrical component and a selection signal, wherein the selection circuit drives the voltage selection inputs to the DC/DC converter to select a first voltage level independent of the voltage selection output of the electrical component when the selection signal is in a first state and drives the voltage selection inputs to the DC/DC converter to select a voltage level dictated by the voltage selection output of the electrical component when the selection signal is in a second state.

11. The system of claim 10, wherein said selection circuit is further configured to receive a fixed voltage setting signal, and wherein the selection circuit drives the voltage selection inputs in accordance with the fixed voltage setting signals when the selection signal is in the first state.

12. The system of claim 10, wherein the first state is assertion of the selection signal.

13. The system of claim 12, further comprising:

a power supply that provides various voltages to the system, wherein the system provides a power good signal which is de-asserted when the system is powered-on until all of the voltage rails in the system are within specified operating levels.

14. The system of claim 13, wherein the selection signal is de-asserted only if the power good signal is asserted.

15. The system of claim 14, wherein the selection signal is provided by a logic gate, and wherein the logic gate is configured to determine the selection signal by combining the power good signal with a mode control signal.

16. A system which comprises:

a DC/DC converter having a feedback input that determines an output voltage of the DC/DC converter;

a voltage divider coupled to the feedback input of the DC/DC converter and coupled to the output voltage of the DC/DC converter;

a selection circuit which controls the impedance of the voltage divider so that the DC/DC converter provides a deterministic first voltage dictated by a motherboard while a select signal is in a first state, and so that the DC/DC converter provides the output voltage selected by a processor when the select signal is in a second state.

17. The system of claim 16, wherein the select signal is based on a power good signal and a mode control signal.

* * * * *